(12) United States Patent
Kim et al.

(10) Patent No.: US 12,165,408 B2
(45) Date of Patent: Dec. 10, 2024

(54) METHOD OF DISPLAYING CONTENT BY AUGMENTED REALITY DEVICE AND AUGMENTED REALITY DEVICE FOR DISPLAYING CONTENT

(71) Applicant: Samsung Electronics Co., Ltd., Suwon-si (KR)

(72) Inventors: Jiin Kim, Suwon-si (KR); Jaeyong Lee, Suwon-si (KR); Jaemin Chun, Suwon-si (KR); Minseok Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 108 days.

(21) Appl. No.: 17/953,787

(22) Filed: Sep. 27, 2022

(65) Prior Publication Data

US 2023/0098951 A1 Mar. 30, 2023

Related U.S. Application Data

(63) Continuation of application No. PCT/KR2022/014357, filed on Sep. 26, 2022.

(30) Foreign Application Priority Data

Sep. 29, 2021 (KR) .................. 10-2021-0128951

(51) Int. Cl.
*G06T 7/73* (2017.01)
*G06F 3/03* (2006.01)
(Continued)

(52) U.S. Cl.
CPC ............. *G06V 20/20* (2022.01); *G06F 3/03* (2013.01); *G06T 7/74* (2017.01); *G06T 11/00* (2013.01); *G06T 2200/24* (2013.01)

(58) Field of Classification Search
CPC ....... G06V 20/20; G06F 3/03; G06F 3/01117; G06T 7/74; G06T 11/00; G06T 2200/24
See application file for complete search history.

(56) References Cited

U.S. PATENT DOCUMENTS 9,378,592 B2 6/2016 Kim et al.
10,438,399 B2 10/2019 Tsukahara et al.
(Continued)

FOREIGN PATENT DOCUMENTS

JP 5691568 B2 4/2015
JP 2019-159076 A 9/2019
(Continued)

OTHER PUBLICATIONS

International Search Report dated Jan. 2, 2023, issued in International Patent Application No. PCT/KR2022/014357.

*Primary Examiner* — Sultana M Zalalee
(74) *Attorney, Agent, or Firm* — Jefferson IP Law, LLP

(57) ABSTRACT

A method and a device are provided. The method includes obtaining spatial information of objects surrounding an augmented reality device, obtaining identification information of the surrounding objects, determining, based on the spatial information and the identification information of the surrounding objects, whether there is, among the surrounding objects, a dangerous object within a preset distance from the augmented reality device, and based on the determining, displaying, within a first distance from the augmented reality device, a first graphical user interface (GUI) for controlling reproduction of the content to be displayed through augmented reality technology, and displaying, within a second distance from the augmented reality device, a second GUI for displaying the content.

16 Claims, 7 Drawing Sheets

(51) Int. Cl.
    *G06T 11/00*     (2006.01)
    *G06V 20/20*     (2022.01)

(56)           References Cited

U.S. PATENT DOCUMENTS

| | | |
|---|---|---|
| 10,909,759 B2 | 2/2021 | Kaino et al. |
| 11,054,650 B2 | 7/2021 | Fujimaki et al. |
| 11,244,497 B2 | 2/2022 | Cho et al. |
| 11,300,794 B2 | 4/2022 | Matsuoka et al. |
| 2014/0078176 A1* | 3/2014 | Kim ................. G06F 3/011 345/633 |
| 2016/0026253 A1* | 1/2016 | Bradski ............. H04N 13/128 345/8 |
| 2018/0045963 A1* | 2/2018 | Hoover ............. H04N 13/156 |
| 2018/0232941 A1* | 8/2018 | Tsukahara ........... A63F 13/533 |
| 2021/0026145 A1 | 1/2021 | Fujimaki |
| 2021/0166484 A1* | 6/2021 | Kim ................. G06V 20/56 |
| 2021/0349309 A1* | 11/2021 | Kawano ............. G06F 3/011 |
| 2022/0035439 A1* | 2/2022 | Holland ............. G06F 3/0482 |

FOREIGN PATENT DOCUMENTS

| | | |
|---|---|---|
| JP | 6931068 B2 | 9/2021 |
| KR | 10-0571832 B1 | 4/2006 |
| KR | 10-2015-0054825 A | 5/2015 |
| KR | 10-2015-0134409 A | 12/2015 |
| KR | 10-2019-0100133 A | 8/2019 |
| KR | 10-2072440 B1 | 3/2020 |
| KR | 10-2020-0115622 A | 10/2020 |
| KR | 10-2021-0046432 A | 4/2021 |
| KR | 10-2306790 B1 | 9/2021 |

\* cited by examiner

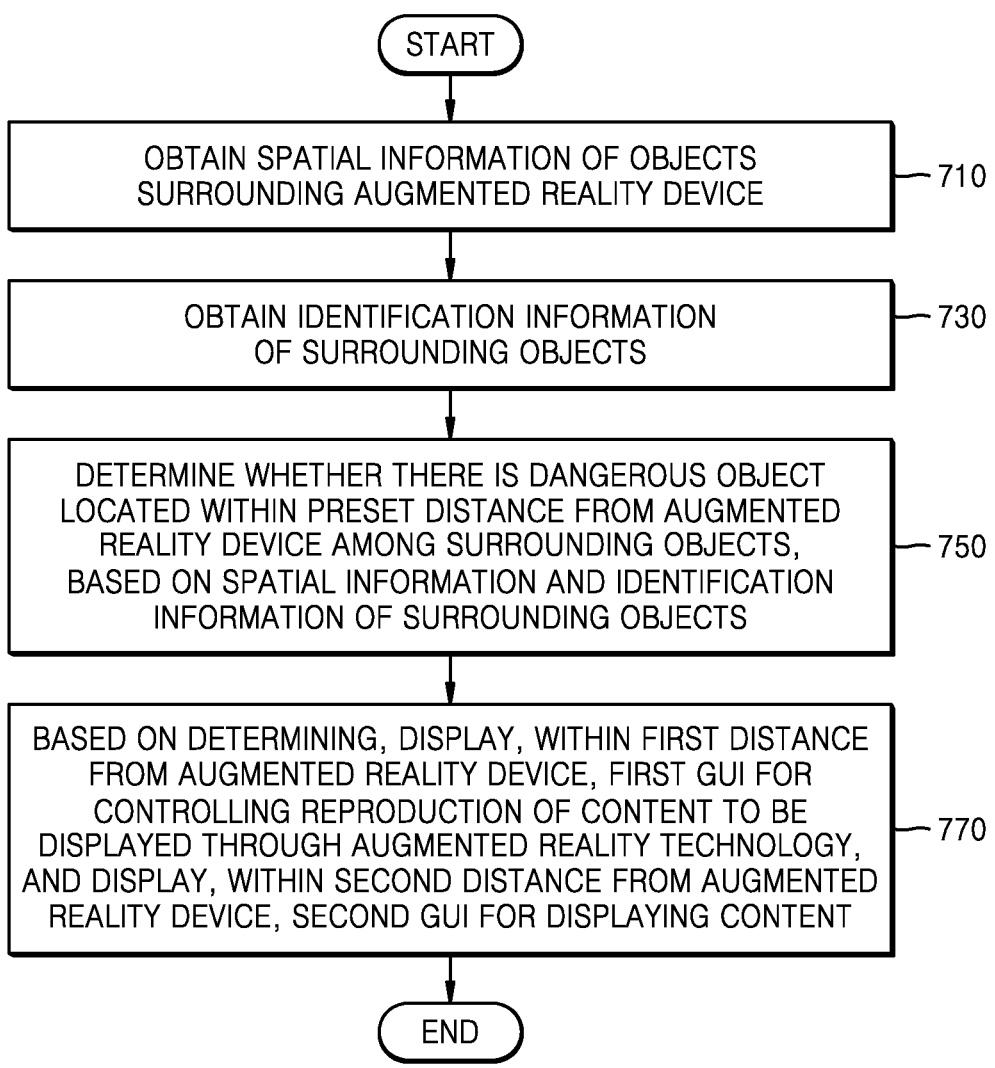

METHOD OF DISPLAYING CONTENT BY AUGMENTED REALITY DEVICE AND AUGMENTED REALITY DEVICE FOR DISPLAYING CONTENT

CROSS-REFERENCE TO RELATED APPLICATION(S)

This application is a continuation application, claiming priority under § 365(c), of an International application No. PCT/KR2022/014357, filed on Sep. 26, 2022, which is based on and claims the benefit of a Korean patent application number 10-2021-0128951, filed on Sep. 29, 2021, in the Korean Intellectual Property Office, the disclosure of which is incorporated by reference herein in its entirety.

TECHNICAL FIELD

The disclosure relates to a method and device for displaying a graphical user interface (GUI) for controlling reproduction of content displayed in augmented reality. More particularly, the disclosure relates to a method and device for displaying a GUI for controlling reproduction of content at a location safe from dangerous objects.

BACKGROUND ART

Augmented reality (AR) is a technique for projecting a virtual image onto a physical environmental space of a real world or a real world object and displaying the same as a single image. An augmented reality device is worn on a face or the head of a user and allows, in that state, the user to view both real world scenes and virtual images together through a see-through type waveguide placed in front of the eyes of the user. As research into augmented reality devices is actively being conducted, various forms of wearable devices have been released or are expected to be released.

When an augmented reality device displays a GUI for controlling content and a GUI for displaying the content, depending on a gaze of a user wearing the augmented reality device, the GUI controlling the content may be sometimes inappropriately displayed. For example, there may be a situation where a GUI is displayed inside a wall, inside a desk, or through a real object, so that the user can check the GUI, but it is impossible to operate the GUI due to physical limitations. Accordingly, the user may have the inconvenience of having to change their posture or move to control the content, and as a result, the GUI may be displayed on an object that has a potential to break to cause injury to the user or an object that has a potential to inflict injury. This is because the augmented reality device recognizes the space around the augmented reality device through simultaneous localization and mapping (SLAM) technology, but is not able to accurately distinguish the surrounding objects, which causes a mismatch when the user actually operates the device, due to visual confusion where real objects and augmented objects are viewed as overlapping each other.

The above information is presented as background information only to assist with an understanding of the disclosure. No determination has been made, and no assertion is made, as to whether any of the above might be applicable as prior art with regard to the disclosure.

DESCRIPTION OF EMBODIMENTS

Solution to Problem

In accordance with an embodiment of the disclosure, a method, performed by an augmented reality device, of displaying content includes obtaining spatial information of objects surrounding the augmented reality device, obtaining identification information of the surrounding objects, determining, based on the spatial information and the identification information of the surrounding objects, whether there is, among the surrounding objects, a dangerous object within a preset distance from the augmented reality device, and based on the determining, displaying, within a first distance from the augmented reality device, a first graphical user interface (GUI) for controlling reproduction of the content to be displayed through augmented reality technology, and displaying, within a second distance from the augmented reality device, a second GUI for displaying the content.

In accordance with an embodiment of the disclosure, an augmented reality device for displaying content includes a camera configured to capture an image of objects surrounding the augmented reality device, a memory, and at least one processor. The at least processor may obtain spatial information of the surrounding objects of the augmented reality device. The at least one processor may obtain identification information of the surrounding objects. The at least one processor may determine, based on the spatial information and the identification information of the surrounding objects, whether there is, among the surrounding objects, a dangerous object within a preset distance from the augmented reality device. Based on the determining, the at least one processor may display, within a first distance from the augmented reality device, a first GUI for controlling reproduction of the content to be displayed through augmented reality technology, and displaying, within a second distance from the augmented reality device, a second GUI for displaying the content.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 7 is a flowchart of a method, performed by an augmented reality device of displaying a first GUI for controlling reproduction of content and displaying a second GUI for displaying content, based on whether there is a dangerous object according to an embodiment of the disclosure.

The same reference numerals are used to represent the same elements throughout the drawings.

MODE OF DISCLOSURE

Figure 1:
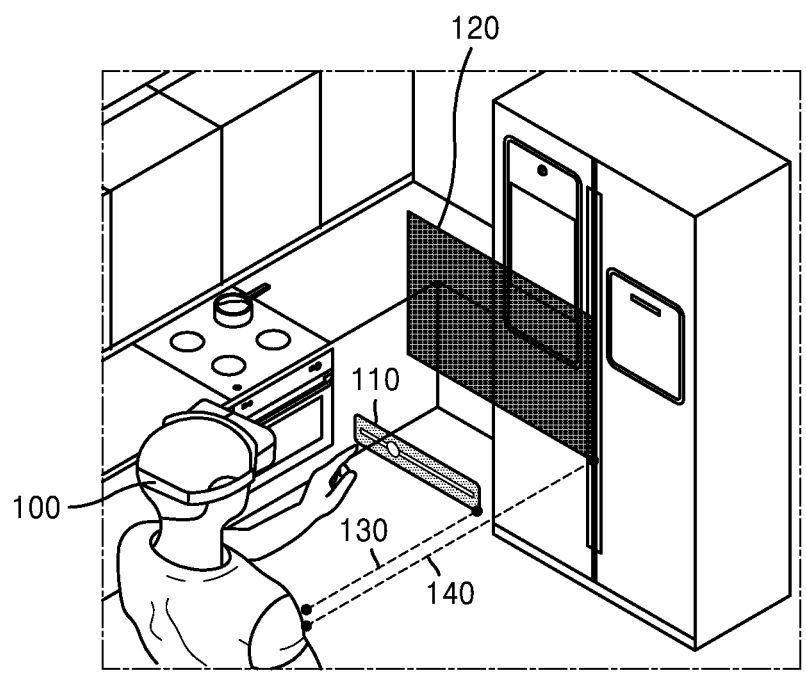
FIG. 1 illustrates an example in which an augmented reality device displays a first graphical user interface (GUI) for controlling reproduction of content and displays a second GUI for displaying the content according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof.

Throughout the specification, when an element is "connected" to another element, the element is connected to the other element not only directly but also electrically through another elements interposed therebetween. Also, when a part may "include" a certain element, unless specified otherwise, it may not be construed to exclude another element but may be construed to further include other elements.

In the disclosure, 'augmented reality (AR)' refers to showing a virtual image together in a physical environment space of the real world or showing a real object and a virtual image together.

In addition, the term 'augmented reality device' refers to a device capable of representing 'augmented reality', and includes not only augmented reality glasses device in the form of glasses worn on a face part of a user but also a head mounted display (HMD) apparatus or an augmented reality helmet worn on the head.

A 'real scene' refers to a scene of the real world that a user sees through an augmented reality device, and may include real world object(s). Also, a 'virtual image' refers to an image generated through an optical engine and may include both a static image and a dynamic image. The virtual image is observed together with a real scene, and may be an image representing information about a real object in the real scene, information about an operation of an augmented reality device, or a control menu, and the like.

Therefore, a typical augmented reality device includes an optical image engine for generating a virtual image composed of light generated from a light source and a light guide plate (waveguide) including a transparent material to guide the virtual image generated by the optical engine to the eyes of a user and allow viewing a scene of the real world together. As described above, as the augmented reality device is to be able to observe scenes in the real world as well, in order to guide light generated in the optical engine to the eyes of the user through the light guide plate, an optical element for changing a path of light which basically has directionality is required. An optical path may be changed by using reflection by a mirror or the like, or the optical path may be changed through diffraction by a diffractive element such as a diffractive optical element (DOE) or a holographic optical element (HOE), but is not limited thereto.

In the disclosure, a 'dangerous object' refers to an object that may be damaged by collision with a user wearing an augmented reality device, an object likely to cause injury to a user due to a collision with the user, and the like, and a 'general object' refers to an object that is not dangerous.

Hereinafter, the disclosure is described with reference to accompanying drawings.

FIG. 1 illustrates an example in which an augmented reality device displays a first graphical user interface (GUI) for controlling reproduction of content and displays a second GUI for displaying the content according to an embodiment of the disclosure.

Referring to FIG. 1, when a user wearing an augmented reality device 100 executes content, the user of the augmented reality device 100 may view the content displayed through the augmented reality device 100. That is, the user may view a virtual image together with a real scene (e.g., the kitchen). A first GUI 110 which controls reproduction of content may move along in a direction in which the user looks, and is displayed away from the augmented reality device 100 by a predetermined, first distance 130 (e.g., 50 cm). A second GUI 120 which displays the content may be displayed away from the augmented reality device 100 by a predetermined, second distance 140 (e.g., 100 cm) which is greater than the first distance.

According to the movement of the user of the augmented reality device 100, objects surrounding the augmented reality device 100 and located in a direction in which the user looks may vary. The first GUI 110 controlling reproduction of content according to the movement of the user may penetrate a wall that cannot be manipulated by the user. In this case, the user may move again to operate the first GUI 110. When the user operates the first GUI 110 because there is an object that may cause injury to the user or an object that may be broken, within the predetermined, first distance 130, the user may be exposed to a danger. A method of preventing the danger as above is described below with reference to FIGS. 2 to 7.

Figure 2:
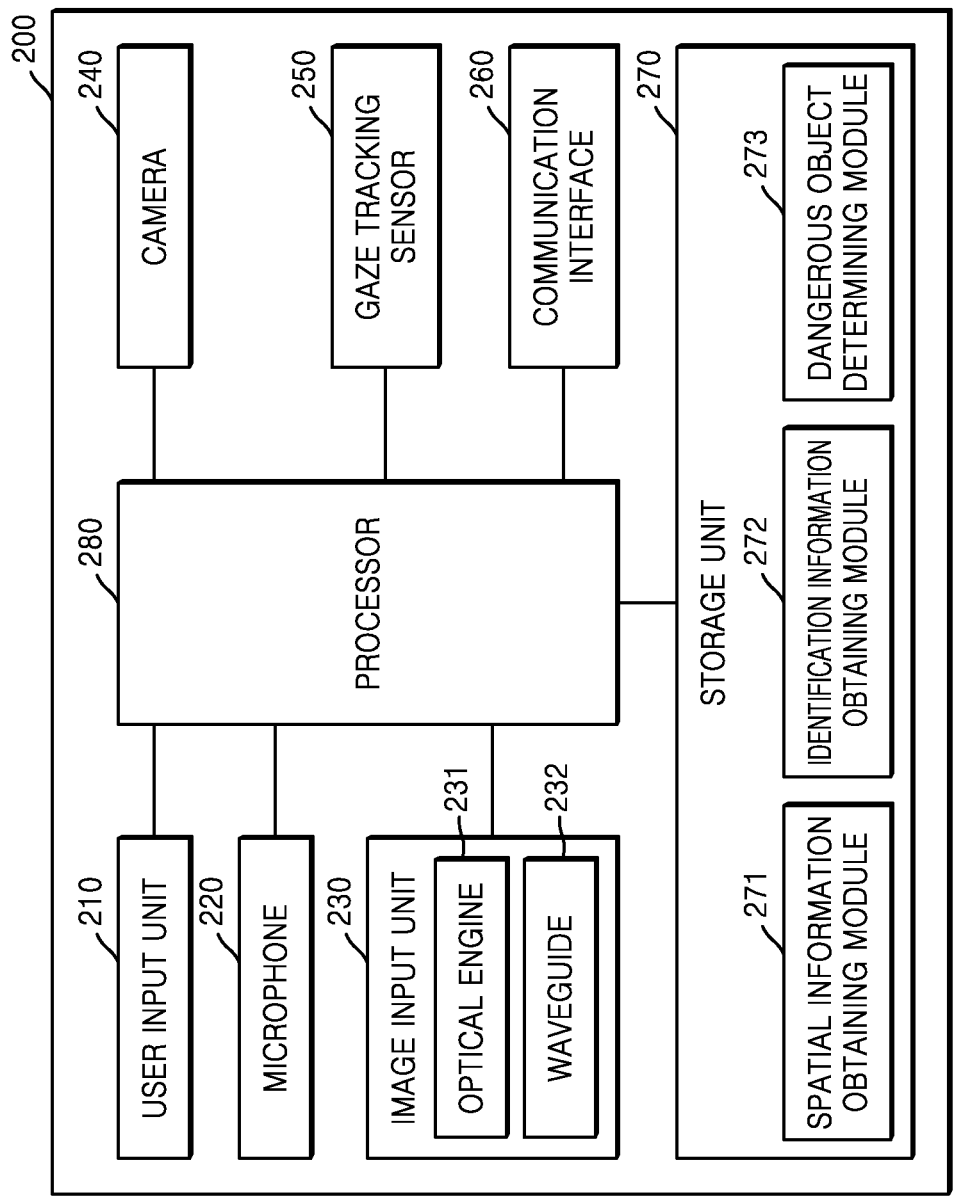
FIG. 2 is a block diagram illustrating an augmented reality device according to an embodiment of the disclosure.

FIG. 2 is a block diagram illustrating an augmented reality device according to an embodiment of the disclosure.

Referring to FIG. 2, an augmented reality device 200 according to an embodiment of the disclosure may include a user input unit 210, a microphone 220, an image output unit 230, a camera 240, a gaze tracking sensor 250, a communication interface 260, a storage unit 270, and a processor 280. Also, the image output unit 230 may include an optical engine 231 and a waveguide 232.

The user input unit 210 refers to a unit used by a user to input data for controlling the augmented reality device 200.

For example, the user input unit 210 may include at least one of a key pad, a dome switch, a touch pad (a contact capacitive type, a pressure resistance film type, infrared sensing type, a surface ultrasonic conduction type, an integral strain gauge type, a piezo-effect type, and the like.), a jog wheel, or a jog switch, but is not limited thereto. The user input unit 210 may receive a user input for adjusting a location of a GUI related to content displayed by the augmented reality device 200 or for controlling the content. The user input unit 210 may be a touch sensor or a button for receiving an input to the augmented reality device 200. Alternatively, the user input unit 210 may be implemented by the camera 240 and a depth sensor (not shown), which will be described later. A user input to a first GUI or a second GUI may be identified by interpreting a gesture of a hand of a user, based on an image of the hand of the user and depth information of the hand of the user.

The microphone 220 receives an external sound signal and processes the same as electrical voice data. For example, the microphone 220 may receive a sound signal from an external device or a speaker. The microphone 220 may use various noise removal algorithms for removing noise occurring while receiving an external sound signal. The microphone 220 may receive a user's voice input for controlling the augmented reality device 200.

The image output unit 230 displays and outputs information processed by the augmented reality device 200. For example, the image output unit 230 may display information related to a user interface for photographing the surroundings of the augmented reality device 200 and a service provided based on images captured from around the augmented reality device 200.

According to an embodiment of the disclosure, the image output unit 230 may provide an AR image. The image output unit 230 according to an embodiment of the disclosure may include the optical engine 231 and the waveguide 232. The optical engine 231 may project, toward the waveguide 232, light of a virtual image to be displayed. The optical engine 231 may include a light source and an image panel. The light source is an optical component that illuminates light, and may generate light by controlling RGB colors. The light source may be composed of, for example, a light-emitting diode (LED). The image panel may include a reflective image panel that reflects light illuminated by a light source while modulating the light into light containing a two-dimensional image. The reflective image panel may be, for example, a Digital Micromirror Device (DMD) panel or a Liquid Crystal on Silicon (LCoS) panel, or other known reflective image panels.

In addition, a virtual image projected from the optical engine 231 to the waveguide 232 may be reflected within the waveguide 232 based on a total reflection principle. The virtual image may be finally output to the eyes of the user after an optical path of the virtual image projected to the waveguide 232 is changed by a diffraction grating formed in a plurality of regions. The waveguide 232 may function as a light guide plate for changing the optical path of the virtual image.

The waveguide 232 may include a transparent material through which a partial region of a rear surface of the augmented reality device 200 is visible when the user wears the augmented reality device 200. The waveguide 232 may include a flat plate having a single-layer or multi-layer structure of a transparent material through which light may be reflected therein and propagated. The waveguide 232 may receive light of a virtual image projected to face an emission surface of the optical engine 231. The transparent material refers to a material through which light may pass. The transparency thereof may not be 100%, and the transparent material may have a certain color. In an embodiment of the disclosure, as the waveguide 232 may include a transparent material, the user may be able to see, through the waveguide 232, not only a virtual object of the totally reflected virtual image, but also an external real scene. Thus, the waveguide 232 may also be referred to as a see through display. The image output unit 230 may provide an augmented reality image by outputting a virtual image through the waveguide 232.

The camera 240 may capture images of the surroundings of the augmented reality device 200. The camera 240 may obtain an image frame such as a still image or a moving picture through an image sensor when an application requiring a photographing function is executed. An image captured through the image sensor may be processed through a processor 280 or a separate image processing unit (not shown). The camera 240 may include, for example, at least one of a rotatable red, green, and blue (RGB) camera module or a plurality of depth camera modules, but is not limited thereto.

Also, the camera 240 may capture images of objects surrounding the user wearing the augmented reality device 200. The camera 240 may provide information obtained by capturing images of surrounding objects to the processor 280 to allow the processor 280 to obtain spatial information and identification information of the surrounding objects.

In addition, the camera 240 may further include a detection sensor to obtain precise information about the surrounding objects around the user.

The gaze tracking sensor 250 may track a gaze of the user wearing the augmented reality device 200. The gaze tracking sensor 250 may be installed in a direction toward the eyes of the user, and may detect a gaze direction of the user's left eye and a gaze direction of the user's right eye. Detecting a gaze direction of the user may include obtaining gaze information related to a gaze of the user.

The gaze tracking sensor 250 may include, for example, at least one of an infrared (IR) scanner or an image sensor. When the augmented reality device 200 is a glasses-type device, a plurality of gaze tracking sensors may be arranged near a left eye waveguide 232L and a right eye waveguide 232R of the augmented reality device 200, respectively, toward the eyes of the user.

The gaze tracking sensor 250 may detect data related to the eye gaze of the user. The user's gaze information may be generated based on data related to the gaze of the user. The gaze information is information related to the user's gaze, and may include, for example, information about the position of pupils of the eyes of the user, coordinates of center points of the pupils, a gaze direction of the user, and the like. The gaze direction of the user may be, for example, a gaze direction from the center points of the pupils of the user toward the user's gaze.

The gaze tracking sensor 250 may provide light to the eye of the user (left eye or right eye) and sense an amount of light reflected from the eye of the user. Also, based on the sensed amount of light, a gaze direction of the eyes of the user, the positions of the pupils of the eyes of the user, coordinates of the center points of the pupils, and the like may be detected.

Alternatively, the gaze tracking sensor 250 may provide light to the eyes of the user and capture an image of the eyes of the user. Also, based on the captured image of the eyes of the user, a gaze direction of the eyes of the user, positions of the pupils of the eyes of the user, coordinates of the center points of the pupils, and the like may be detected.

According to an embodiment of the disclosure, the gaze tracking sensor 250 may sense the eyes of the user wearing the augmented reality device 200 at preset time intervals.

The communication interface 260 may transmit or receive data for receiving a service related to the augmented reality device 200, to and from an external device (not shown) and a server (not shown).

The storage unit 270 may store a program to be executed by the processor 280 to be described later, and may store data input to the augmented reality device 200 or output from the augmented reality device 200.

The storage unit 270 may include at least one type of storage medium from among a flash memory type, a hard disk type, a multimedia card micro type, a card type memory (e.g., secure digital (SD) or extreme digital (XD) memory, and the like), random access memory (RAM), static random access memory (SRAM), read-only memory (ROM), electrically erasable programmable read-only memory (EEPROM), programmable read-only memory (PROM), magnetic memory, a magnetic disk, or an optical disk.

Programs stored in the storage unit 270 may be classified into a plurality of modules according to their functions, for example, a spatial information obtaining module 271, an identification information obtaining module 272, and a dangerous object determination module 273.

The processor 280 may control the overall operation of the augmented reality device 200. For example, by executing the programs stored in the storage unit 270, the processor 280 may control the overall operations of the user input unit 210, the microphone 220, the image output unit 230, the camera 240, the detection sensor 245, the gaze tracking sensor 250, the communication interface 260, and the storage unit 270.

By executing the spatial information obtaining module 271, the identification information obtaining module 272, and the dangerous object determination module 273 stored in the storage unit 270, the processor 280 may display a first GUI for controlling reproduction of content, at a safe location from dangerous objects.

The processor 280 may obtain spatial information of surrounding objects near the augmented reality device 200 by executing the spatial information obtaining module 271 stored in the storage unit 270. The processor 280 may obtain spatial information of objects surrounding the augmented reality device 200, that is, information about the surrounding topography (walls and floor) of the augmented reality device 200 by performing simultaneous localization and mapping (SLAM) by using images captured by the camera 240 and mapping the topography around the augmented reality device 200 and detecting a location of the augmented reality device 200 at the same time.

The processor 280 may obtain identification information of surrounding objects near the augmented reality device 200 by executing the identification information obtaining module 272 stored in the storage unit 270. The processor 280 may obtain identification information of the surrounding objects, that is, the surrounding objects of the augmented reality device 200 (e.g., a desk lamp, a water glass) by performing object recognition using the images captured by the camera 240.

By executing the dangerous object determination module 273 stored in the storage unit 270, the processor 280 may determine whether there is a dangerous object between the augmented reality device 200 and a GUI that controls reproduction of content displayed by the augmented reality device 200, and determine a method of displaying the GUI that controls the reproduction of content, based on a result of determining whether there is a dangerous object.

A method, performed by the processor 280, of obtaining spatial information and identification information of surrounding objects, determining whether there is a dangerous object, based on the spatial information and the identification information, and displaying content based on the determination of whether there is a dangerous object is described later in detail with reference to FIGS. 4 to 7.

Figure 3:
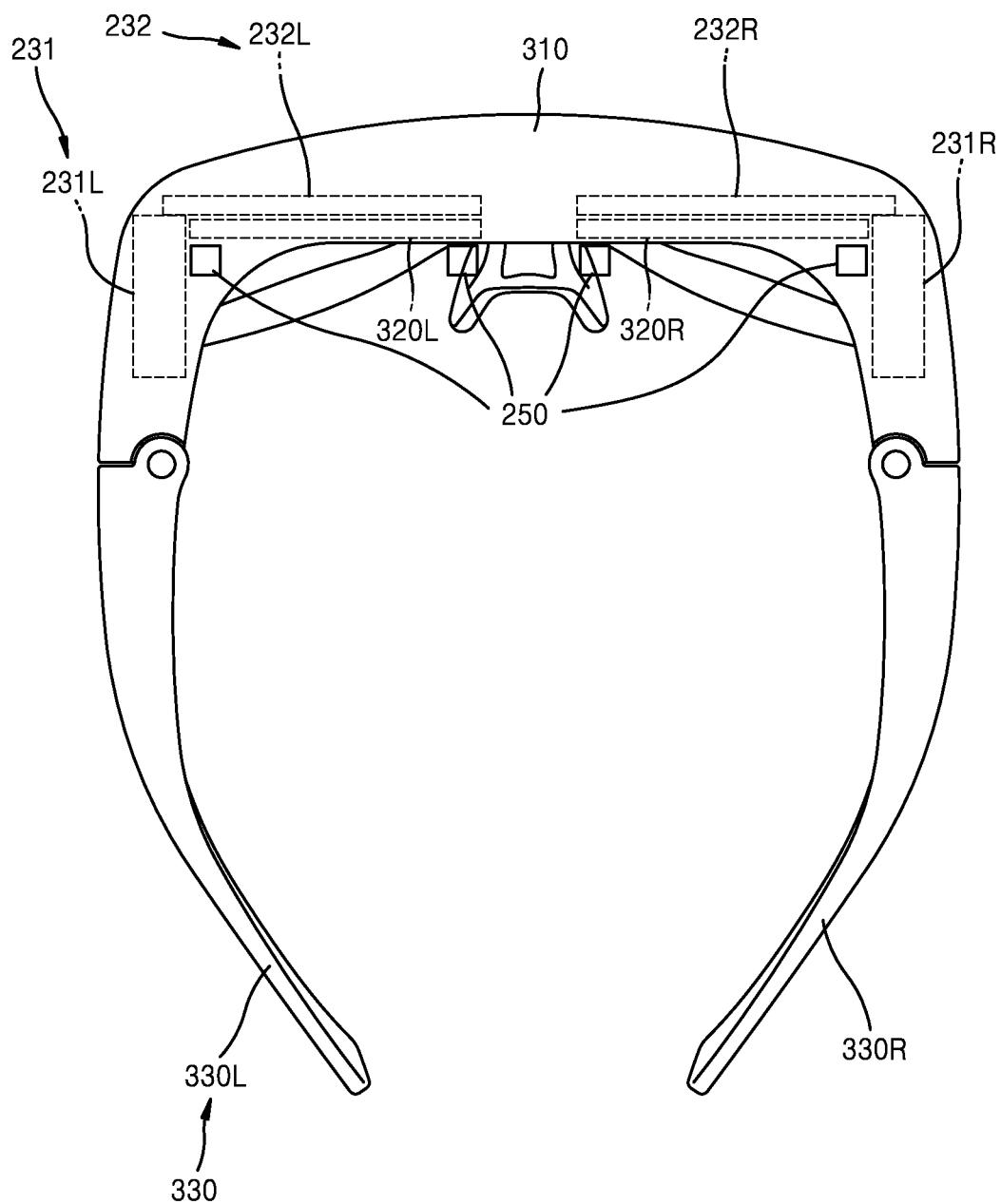
FIG. 3 is a view illustrating an augmented reality device according to an embodiment of the disclosure.

FIG. 3 is a view illustrating an augmented reality device according to an embodiment of the disclosure.

The augmented reality device 200 of FIG. 2 may be implemented as, for example, a glasses-type display device including a glasses-type body as illustrated in FIG. 3, but is not limited thereto.

Referring to FIG. 3, the augmented reality device 200 is a glasses-type display device and may include a glasses-type body configured to be worn by a user.

The glasses-type body may include a frame 310 and temples 330, and the temples 330 may be respectively connected to end pieces of the frame 310.

Also, left and right eyeglasses 320L and 320R and the waveguide 232 may be positioned in the frame 310. The left and right eyeglasses 320L and 320R are an example, and may or may not have refractive power (lens prescriptions). Alternatively, the left and right eyeglasses 320L and 320R may be formed as a single body or may be omitted. Also, the waveguide 232 may be configured through which projected light is received from an input area and at least a portion of the input light is output in an output area. The waveguide 232 may include a left-eye waveguide 232L and a right-eye waveguide 232R.

The left eyeglass 320L and the left-eye waveguide 232L may be arranged at positions corresponding to the user's left eye, and the right eyeglass 320R and the right-eye waveguide 232R may be arranged at positions corresponding to the user's right eye. For example, the left eyeglass 320L and the left-eye waveguide 232L may be attached to each other, or the right eyeglass 320R and the right-eye waveguide 232R may be attached to each other, but are not limited thereto.

Also, the optical engine 231 of a projector for projecting light containing an image may include a left-eye optical engine 231L and a right-eye optical engine 231R. The left-eye optical engine 231L and the right-eye optical engine 231R may be located at both ends of the frame 310. Light emitted from the optical engine 231 may be displayed through the waveguide 232.

The gaze tracking sensor 250 may be arranged on edges of lenses of the augmented reality device 200, and may include, for example, a light source module that provides light toward the eyes of the user and an optical sensor that receives the provided light. The light source module may provide light toward a region of the eyes of the user while changing a direction of light at preset time intervals. For example, light (e.g., infrared (IR) light) provided from the light source module may be projected toward the eyes of the user in a preset pattern (e.g., a straight line in a longitudinal direction or a straight line in a transverse direction). The gaze tracking sensor 250 may track a gaze of the eyes of the user by using the optical sensor to identify the corneal area and the pupil area of the eyes of the user based on a change in an amount of light reflected from the region of the eyes of the user.

In addition, the augmented reality device 200 may include a camera (not shown) arranged on at least one of a front surface or a side surface of the augmented reality device 200 to capture images around the augmented reality device 200 and obtain information about the surroundings of the augmented reality device 200. The augmented reality device 200 may obtain spatial information and identification information of surrounding objects of the augmented reality device 200 from surrounding images captured by a camera by performing SLAM and object recognition.

Figure 4:
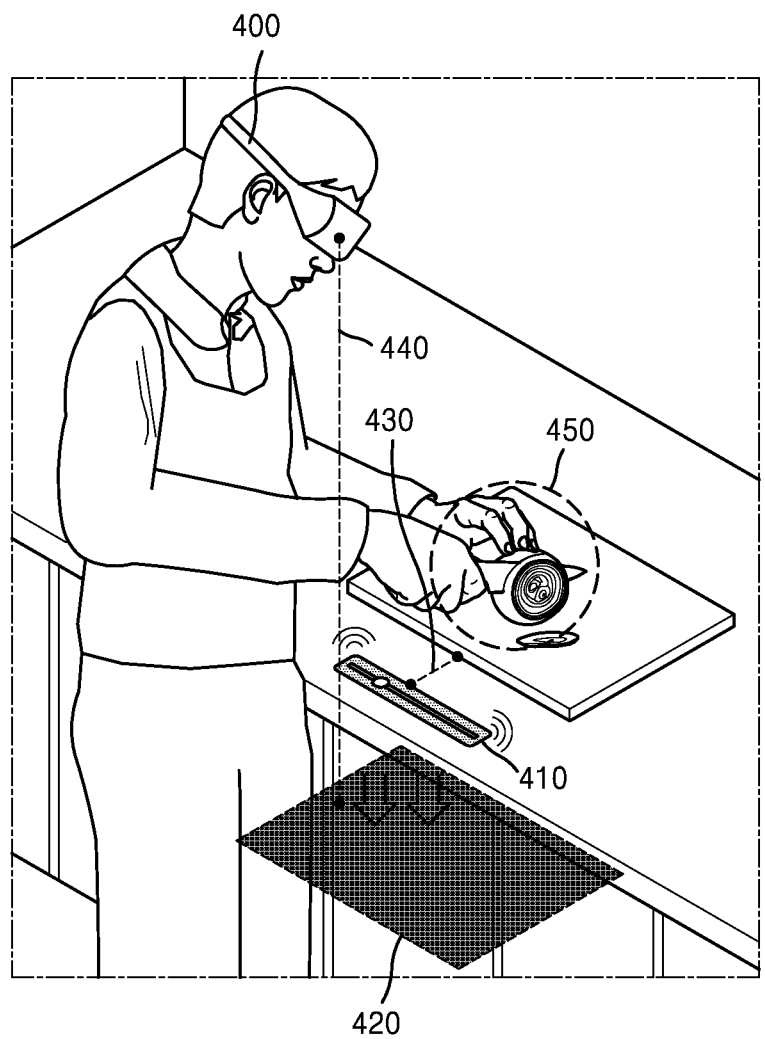
FIG. 4 illustrates an example in which an augmented reality device displays a first GUI for controlling reproduction of content based on whether there is a dangerous object among surrounding objects according to an embodiment of the disclosure.

FIG. 4 illustrates an example in which an augmented reality device displays a first GUI for controlling reproduction of content based on whether there is a dangerous object among surrounding objects according to an embodiment of the disclosure.

Referring to FIG. 4, a first GUI for controlling reproduction of content and a second GUI for displaying content are moved together in a direction a user is looking according to movement of the user (e.g., starts cooking by lowering his or her head). There is a dangerous object 450 (e.g., a knife) within the preset first distance 130 from an augmented reality device 400 worn by the user. In this case, as a second GUI 420 for displaying content does not require a separate operation or is not operated for a long period of time, the second GUI 420 is displayed through a desk at a location away by the preset second distance 440. However, the first GUI 410 that controls reproduction of content may be displayed on a surface of a general object that is away from the dangerous object 450 by a certain distance 430. The certain distance 430 from the dangerous object 450 may be set as a distance at which the user is determined to be safe depending on the dangerous object 450. The first GUI 410 may be displayed on the surface of the general object after a display effect in which the first GUI sticks onto the surface of the general object is displayed. As the first GUI 410 is displayed on the surface of the general object within the preset first distance 130, the first GUI, which requires operation by a user, may be prevented from being displayed after penetrating the surface of the general object and making it impossible to operate the same. In addition, the user of the augmented reality device 400 may know that the first GUI 410 is displayed at a safe location through the display effect in which the first GUI 410 sticks like a magnet. Accordingly, the user of the augmented reality device 400 may easily control the content at a safe location free from danger.

Figure 5:
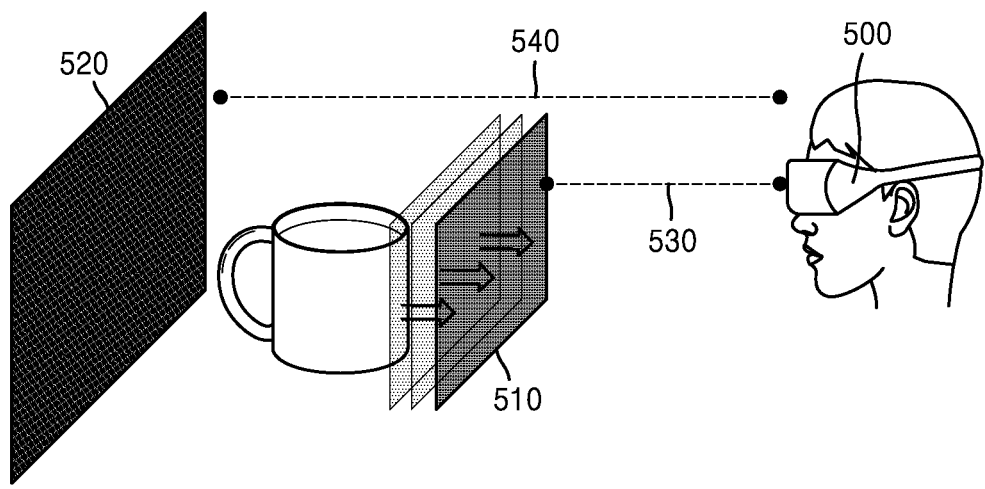
FIG. 5 illustrates an example in which an augmented reality device displays a first GUI for controlling reproduction of content based on whether there is a dangerous object among surrounding objects according to an embodiment of the disclosure.

FIG. 5 illustrates an example in which an augmented reality device displays a first GUI for controlling reproduction of content based on whether there is a dangerous object among surrounding objects according to an embodiment of the disclosure.

Referring to FIG. 5, there is a dangerous object that has a potential to break, such as a cup, within a preset distance from an augmented reality device 500 worn by a user.

When it is determined that a dangerous object exists within a preset distance from the user wearing the augmented reality device 500 in a direction in which the user is looking, according to the movement of the user, a first GUI 510 for controlling reproduction of content is displayed away from the dangerous object, and is displayed at a distance 530 closer than the preset first distance 130, and a second GUI 520 that displays the content may be displayed at a location away from the user wearing the augmented reality device 500, by a preset second distance 540. After a display effect in which the first GUI 510 bounces off the dangerous object is displayed, the first GUI 510 may be displayed apart from the dangerous object. From the display effect in which the first GUI 510 bounces off the dangerous object, the user of the augmented reality device 500 may know that there is the dangerous object nearby and that the first GUI 510 is displayed at a safe location from the dangerous object.

Figure 6:
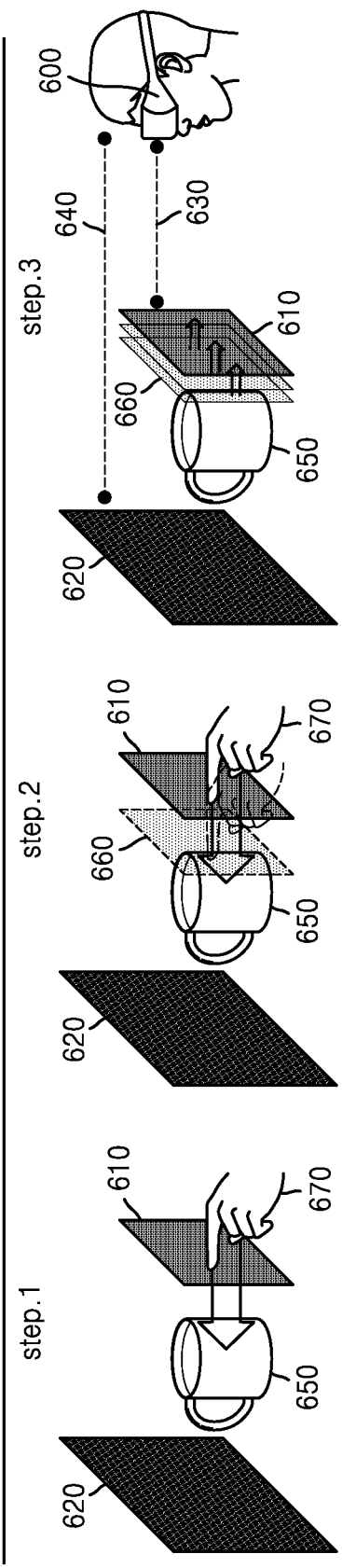
FIG. 6 illustrates an example of adjusting and displaying a location of a first GUI when a user of an augmented reality device moves the location of the first GUI, which controls reproduction of content, close to a dangerous object according to an embodiment of the disclosure.

FIG. 6 illustrates an example of adjusting and displaying a location of a first GUI when a user of an augmented reality device moves the location of the first GUI, which controls reproduction of content, close to a dangerous object according to an embodiment of the disclosure.

Referring to FIG. 6, an augmented reality device 600 may receive a user input 670 such as a gesture for moving a first GUI 610 for controlling reproduction of content, to the vicinity of a dangerous object 650 within the preset first distance 130 at step 1. Accordingly, the first GUI 610 is moved to a location 660 near the dangerous object 650 at step 2, but the augmented reality device 600 may display a display effect in which the first GUI 610 bounces off in an opposite direction to the location 660 near the dangerous object 650, and display the first GUI 610 at a location apart from the dangerous object 650 and from the augmented reality device 600 by a distance 630 closer than the preset first distance 130 at step 3. A second GUI 620 for displaying the content is displayed without change at a location away from the augmented reality device 600 by a preset second distance 640.

FIG. 7 is a flowchart of a method, performed by an augmented reality device of displaying a first GUI for controlling reproduction of content and displaying a second GUI for displaying content, based on whether there is a dangerous object according to an embodiment of the disclosure.

Referring to FIG. 7, in operation 710, the augmented reality device 200 obtains spatial information of objects surrounding the augmented reality device 200.

According to an embodiment of the disclosure, spatial information may be obtained through SLAM.

In operation 730, the augmented reality device 200 obtains identification information of surrounding objects.

According to an embodiment of the disclosure, the identification information may be obtained through object recognition.

In operation 750, the augmented reality device 200 determines whether there is a dangerous object located within a preset distance from the augmented reality device among the surrounding objects, based on spatial information and identification information of the surrounding objects.

According to an embodiment of the disclosure, the dangerous object may include at least one of an object that can be damaged by a collision with a user wearing the augmented reality device 200 or an object likely to cause injury to the user from a collision with the user.

In step 770, based on the determination, the augmented reality device 200 displays, within a first distance from the augmented reality device 200, a first GUI for controlling reproduction of content to be displayed through the augmented reality technology, and displays, within a second distance from the augmented reality device, a second GUI for displaying the content.

According to an embodiment of the disclosure, after being displayed through a display effect in which the first GUI bounces off the dangerous object, the first GUI may be spaced apart from the dangerous object and displayed between the dangerous object and the augmented reality device 200.

According to an embodiment of the disclosure, after a display effect in which a first GUI sticks to a surface of a general object other than the dangerous object among surrounding objects is displayed, the first GUI may be displayed on the surface.

According to an embodiment of the disclosure, a general object may be located between a dangerous object and an augmented reality device.

According to an embodiment of the disclosure, the general object may be located near the dangerous object.

According to an embodiment of the disclosure, a second GUI may be displayed at a distance greater than the first GUI.

According to an embodiment of the disclosure, the second GUI may be displayed irrespective of the surrounding objects.

According to an embodiment of the disclosure, a method, performed by an augmented reality device, of displaying content, the method may comprises obtaining spatial information and identification information of objects surrounding the augmented reality device, determining, based on the spatial information and the identification information of the surrounding objects, whether there is, among the surrounding objects, a dangerous object within a preset distance from the augmented reality device, and based on the determining, displaying, within a first distance from the augmented reality device, a first graphical user interface (GUI) for controlling reproduction of content, and displaying, within a second distance from the augmented reality device, a second GUI for displaying the content.

According to an embodiment of the disclosure, the dangerous object may comprise at least one of an object likely to be damaged by a collision with a user wearing the augmented reality device or an object likely to cause injury to the user from a collision with the user.

According to an embodiment of the disclosure, the spatial information of the surrounding objects may be obtained through simultaneous location and mapping (SLAM).

According to an embodiment of the disclosure, the identification information may be obtained through object recognition.

According to an embodiment of the disclosure, after being displayed through a display effect in which the first GUI bounces off the dangerous object, the first GUI may be spaced apart from the dangerous object and displayed between the dangerous object and the augmented reality device.

According to an embodiment of the disclosure, after a display effect in which the first GUI sticks to a surface of a general object, which is not dangerous, among the surrounding objects, the first GUI may be displayed on the surface.

According to an embodiment of the disclosure, the general object may be located between the dangerous object and the augmented reality device.

According to an embodiment of the disclosure, the general object may be located in a vicinity of the dangerous object.

According to an embodiment of the disclosure, the second GUI may be displayed at a greater distance from the augmented reality device than the first GUI is.

According to an embodiment of the disclosure, the second GUI may be displayed irrespective of the surrounding objects.

According to an embodiment of the disclosure, a method, performed by an augmented reality device, of displaying content, the method may allow the user to safely use the first GUI from the dangerous object by obtaining spatial information and identification information of objects surrounding the augmented reality device, determining, based on the spatial information and the identification information of the surrounding objects, whether there is, among the surrounding objects, a dangerous object within a preset distance from the augmented reality device, and based on the determining, displaying, within a first distance from the augmented reality device, a first graphical user interface (GUI) for controlling reproduction of content, and displaying, within a second distance from the augmented reality device, a second GUI for displaying the content.

According to an embodiment of the disclosure, a method, performed by an augmented reality device, of displaying content, the method may display intuitively that the first GUI cannot be arranged near the dangerous object by displaying the first GUI, the first GUI is spaced apart from the dangerous object and displayed between the dangerous object and the augmented reality device, after displaying a display effect in which the first GUI bounces off the dangerous object.

According to an embodiment of the disclosure, a method, performed by an augmented reality device, of displaying content, the method may display intuitively that the first GUI cannot be arranged near the dangerous object by displaying the first GUI, the first GUI is spaced apart from the dangerous object and displayed between the dangerous object and the augmented reality device, after displaying a display effect in which the first GUI bounces off the dangerous object.

According to an embodiment of the disclosure, an augmented reality device for displaying content, the augmented reality device may comprise a camera configured to capture an image of objects surrounding the augmented reality device; a memory; and at least one processor. The at lease processor may obtain spatial information of the surrounding objects, obtain identification information of the surrounding objects, determine, based on the spatial information of the surrounding objects and the identification information of the surrounding objects, whether there is, among the surrounding objects, a dangerous object within a preset distance from the augmented reality device, and based on the determining, display, within a first distance from the augmented reality device, a first graphical user interface (GUI) for controlling reproduction of the content to be displayed through augmented reality technology, and display, within a second distance from the augmented reality device, a second GUI for displaying the content.

According to an embodiment of the disclosure, the dangerous object may comprise at least one of an object likely to be damaged by a collision with a user wearing the augmented reality device or an object likely to cause injury to the user from a collision with the user.

According to an embodiment of the disclosure, the spatial information of the surrounding objects may be obtained through simultaneous location and mapping (SLAM).

According to an embodiment of the disclosure, the identification information may be obtained through object recognition.

According to an embodiment of the disclosure, after being displayed through a display effect in which the first GUI bounces off the dangerous object, the first GUI may be spaced apart from the dangerous object and displayed between the dangerous object and the augmented reality device.

According to an embodiment of the disclosure, after a display effect in which the first GUI sticks to a surface of a general object, which is not dangerous, among the surrounding objects, the first GUI may be displayed on the surface.

According to an embodiment of the disclosure, the general object may be located between the dangerous object and the augmented reality device.

According to an embodiment of the disclosure, the general object may be located in a vicinity of the dangerous object.

According to an embodiment of the disclosure, the second GUI may be displayed at a greater distance from the augmented reality device than the first GUI is.

According to an embodiment of the disclosure, the second GUI may be displayed irrespective of the surrounding objects.

According to an embodiment of the disclosure, an augmented reality device for displaying content, the augmented reality device may allow the user to safely use the first GUI from the dangerous object by obtaining spatial information and identification information of objects surrounding the augmented reality device, determining, based on the spatial information and the identification information of the surrounding objects, whether there is, among the surrounding objects, a dangerous object within a preset distance from the augmented reality device, and based on the determining, displaying, within a first distance from the augmented reality device, a first graphical user interface (GUI) for controlling reproduction of content, and displaying, within a second distance from the augmented reality device, a second GUI for displaying the content.

According to an embodiment of the disclosure, an augmented reality device for displaying content, the augmented reality device may display intuitively that the first GUI cannot be arranged near the dangerous object by displaying the first GUI, the first GUI is spaced apart from the dangerous object and displayed between the dangerous object and the augmented reality device, after displaying a display effect in which the first GUI bounces off the dangerous object.

According to an embodiment of the disclosure, an augmented reality device for displaying content, the augmented reality device may display intuitively that the first GUI cannot be arranged near the dangerous object by displaying the first GUI, the first GUI is spaced apart from the dangerous object and displayed between the dangerous object and the augmented reality device, after displaying a display effect in which the first GUI bounces off the dangerous object.

The disclosure has been described with reference to various embodiments thereof. It will be understood by those of ordinary skill in the art that various changes in form and details may be made therein without departing from the spirit and scope of the disclosure as defined by the appended claims. The disclosed embodiments should be considered in a descriptive sense only and not for purposes of limitation. Therefore, the scope of the disclosure is defined not by the detailed description of the disclosure but by the appended claims, and all differences within the scope will be construed as being included in the disclosure.

The aforementioned embodiments of the disclosure may be written into a program that may be executed by a computer, and may be implemented in a universal digital computer for carrying out the program by using a computer-readable recording medium. The computer-readable recording medium includes a storage medium, such as magnetic storage medium (e.g., ROM, floppy disk, hard disk, etc.), an optical medium (e.g., compact disc read-only memory (CD-ROM), digital versatile disc (DVD), etc.), or the like.

A machine-readable storage medium may be provided in a form of a non-transitory storage medium. The term 'non-transitory storage medium' may mean a tangible device without including a signal, e.g., electromagnetic waves, and may not distinguish between storing data in the storage medium semi-permanently and temporarily. For example, the 'non-transitory storage medium' may include a buffer that temporarily stores data.

In an embodiment of the disclosure, the aforementioned method according to the various embodiments of the disclosure may be provided in a computer program product. Computer program products can be traded between sellers and buyers as commodities. The computer program product may be distributed in a form of machine-readable storage medium (for example, a compact disc read-only memory (CD-ROM)), or distributed (for example, downloaded or uploaded) through an application store or directly or online between two user devices (for example, smart phones). In the case of online distribution, at least part of the computer program product (e.g., a downloadable app) may be at least temporarily stored or arbitrarily created in a storage medium that may be readable to a device such as a memory of a server of the manufacturer, a server of the application store, or a relay server.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method, performed by an augmented reality device, of displaying content, the method comprising:
    obtaining spatial information of objects surrounding the augmented reality device;
    obtaining identification information of the surrounding objects;
    determining, based on the spatial information of the surrounding objects and the identification information of the surrounding objects, whether there is, among the surrounding objects, a dangerous object within a preset distance from the augmented reality device; and
    based on the determining, displaying, within a first distance from the augmented reality device, a first graphical user interface (GUI) for controlling reproduction of the content to be displayed through augmented reality technology, wherein the first GUI is operated by a user, and displaying, within a second distance from the augmented reality device, a second GUI for displaying the content,
    wherein, after being displayed through a display effect in which the first GUI bounces off the dangerous object, the first GUI is spaced apart from the dangerous object and displayed between the dangerous object and the augmented reality device.

2. The method of claim 1, wherein the dangerous object comprises at least one of an object likely to be damaged by a collision with the user wearing the augmented reality device or an object likely to cause injury to the user from a collision with the user.

3. The method of claim 1, wherein the spatial information of the surrounding objects is obtained through simultaneous location and mapping (SLAM).

4. The method of claim 1, wherein the identification information is obtained through object recognition.

5. The method of claim 1, wherein, after a display effect in which the first GUI sticks to a surface of a general object, which is not dangerous, among the surrounding objects, the first GUI is displayed on the surface.

6. The method of claim 5, wherein the general object is located between the dangerous object and the augmented reality device.

7. The method of claim 5, wherein the general object is located in a vicinity of the dangerous object.

8. The method of claim 1, wherein the second GUI is displayed at a greater distance from the augmented reality device than the first GUI is.

9. The method of claim 1, wherein the second GUI is displayed irrespective of the surrounding objects.

10. An augmented reality device for displaying content, the augmented reality device comprising:
    a camera configured to capture an image of objects surrounding the augmented reality device;
    a memory; and
    at least one processor,
    wherein the at least one processor is configured to:
        obtain spatial information of the surrounding objects,
        obtain identification information of the surrounding objects,
        determine, based on the spatial information of the surrounding objects and the identification information of the surrounding objects, whether there is, among the surrounding objects, a dangerous object within a preset distance from the augmented reality device, and
        based on the determining, display, within a first distance from the augmented reality device, a first graphical user interface (GUI) for controlling reproduction of the content to be displayed through augmented reality technology, wherein the first GUI is operated by a user, and display, within a second distance from the augmented reality device, a second GUI for displaying the content, and
    wherein, after being displayed through a display effect in which the first GUI bounces off the dangerous object, the first GUI is spaced apart from the dangerous object and displayed between the dangerous object and the augmented reality device.

11. The augmented reality device of claim 10, wherein the dangerous object comprises at least one of an object likely to be damaged by a collision with the user wearing the augmented reality device or an object likely to cause injury to the user from a collision with the user.

12. The augmented reality device of claim 10, wherein the spatial information of the surrounding objects is obtained through simultaneous location and mapping (SLAM).

13. The augmented reality device of claim 10, wherein the identification information is obtained through object recognition.

14. The augmented reality device of claim 10, wherein a distance of which the first GUI and the dangerous object are spaced apart is determined based on a degree of danger of the dangerous object.

15. The augmented reality device of claim 14, wherein, when the first GUI is displayed on a surface of a general object within a preset first distance from the general object, the first GUI requiring operation by a user, is prevented from being displayed after colliding with the surface of the general object.

16. The augmented reality device of claim 15, wherein, in order to indicate to the user that the first GUI is displayed at a safe location through a display, the first GUI sticks with a force of a magnet.

* * * * *